(12) United States Patent
Ezaki

(10) Patent No.: US 12,314,562 B2
(45) Date of Patent: *May 27, 2025

(54) DISPLAY CONTROL DEVICE AND DISPLAY CONTROL METHOD FOR PREVENTING OVERLAPPING OF HIGH PRIORITY DISPLAY REGIONS

(71) Applicant: Faurecia Clarion Electronics Co., Ltd., Saitama (JP)

(72) Inventor: Jitsu Ezaki, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 265 days.

This patent is subject to a terminal disclaimer.

(21) Appl. No.: 17/416,445

(22) PCT Filed: Apr. 26, 2019

(86) PCT No.: PCT/JP2019/017950
§ 371 (c)(1),
(2) Date: Jun. 18, 2021

(87) PCT Pub. No.: WO2020/136933
PCT Pub. Date: Jul. 2, 2020

(65) Prior Publication Data
US 2022/0050592 A1    Feb. 17, 2022

(30) Foreign Application Priority Data
Dec. 25, 2018   (JP) .................. 2018-240711

(51) Int. Cl.
*G06F 3/04886* (2022.01)
(52) U.S. Cl.
CPC .......... *G06F 3/04886* (2013.01); *G06F 2203/04803* (2013.01)

(58) Field of Classification Search
None
See application file for complete search history.

(56) References Cited

U.S. PATENT DOCUMENTS 5,675,755 A * 10/1997 Trueblood ............ G06F 3/0481
715/791
6,760,048 B1 * 7/2004 Bates .................... G06F 3/0481
715/781

(Continued)

FOREIGN PATENT DOCUMENTS

JP   11-134159 A      5/1999
JP   2001103468 A  *  4/2001

(Continued)

OTHER PUBLICATIONS

International Search Report, PCT/JP2019/017950, Jun. 25, 2019 (4 pgs.).

(Continued)

*Primary Examiner* — Matthew Ell
*Assistant Examiner* — Gabriel Mercado
(74) *Attorney, Agent, or Firm* — Volpe Koenig

(57) ABSTRACT

A display control device includes a divided-region setting unit for dynamically changing a size of a divided region provided on a screen. A display control unit provides arrangement regions on the divided region and changes a relative positional relationship between the arrangement regions on the same divided region in conformity with change in size of the divided region, each of the arrangement regions on which at least one or more display objects are arranged, and a priority setting unit configured to set relative priority with respect to the arrangement regions provided on the same display region. When the relative positional relationship between the arrangement regions on the same divided region is changed, which causes the arrangement regions to overlap at least partially, the display control unit (Continued)

controls display of the display objects in a unit of arrangement region, based on the priority set for each of the arrangement regions.

10 Claims, 15 Drawing Sheets

(56) References Cited

U.S. PATENT DOCUMENTS

| | | | |
|---|---|---|---|
| 10,198,178 B2 | 2/2019 | Sato | |
| 2005/0268247 A1* | 12/2005 | Baneth | G06F 3/04886 715/802 |
| 2007/0180401 A1* | 8/2007 | Singh | G06F 3/0481 715/803 |
| 2010/0050114 A1* | 2/2010 | Braun | G16H 40/63 715/788 |
| 2011/0025719 A1 | 2/2011 | Yanase | |
| 2014/0282017 A1* | 9/2014 | Kanazawa | G06F 3/013 715/733 |
| 2016/0110069 A1* | 4/2016 | Tanoue | G06F 3/0482 715/845 |
| 2017/0315962 A1 | 11/2017 | Kovar | |
| 2017/0364249 A1 | 12/2017 | Kumaki | |
| 2017/0365930 A1 | 12/2017 | Nishioka | |
| 2018/0356964 A1* | 12/2018 | Morris | G06F 3/011 |

FOREIGN PATENT DOCUMENTS

| | | |
|---|---|---|
| JP | 2011-034568 A | 2/2011 |
| JP | 2015-087861 A | 5/2015 |
| JP | 2017-227976 A | 12/2017 |
| JP | 2018-198096 A | 12/2018 |
| WO | 2017/192170 A1 | 11/2017 |

OTHER PUBLICATIONS

Japanese Office Action issued on Jul. 26, 2022 for Japanese Patent Application No. 2018-240711.
Chinese Office Action issued on Oct. 28, 2023 for Chinese Patent Application No. 201980074031.2.
Chinese Office Action issued on May 8, 2024 for Chinese Patent Application No. 201980074031.2.

* cited by examiner

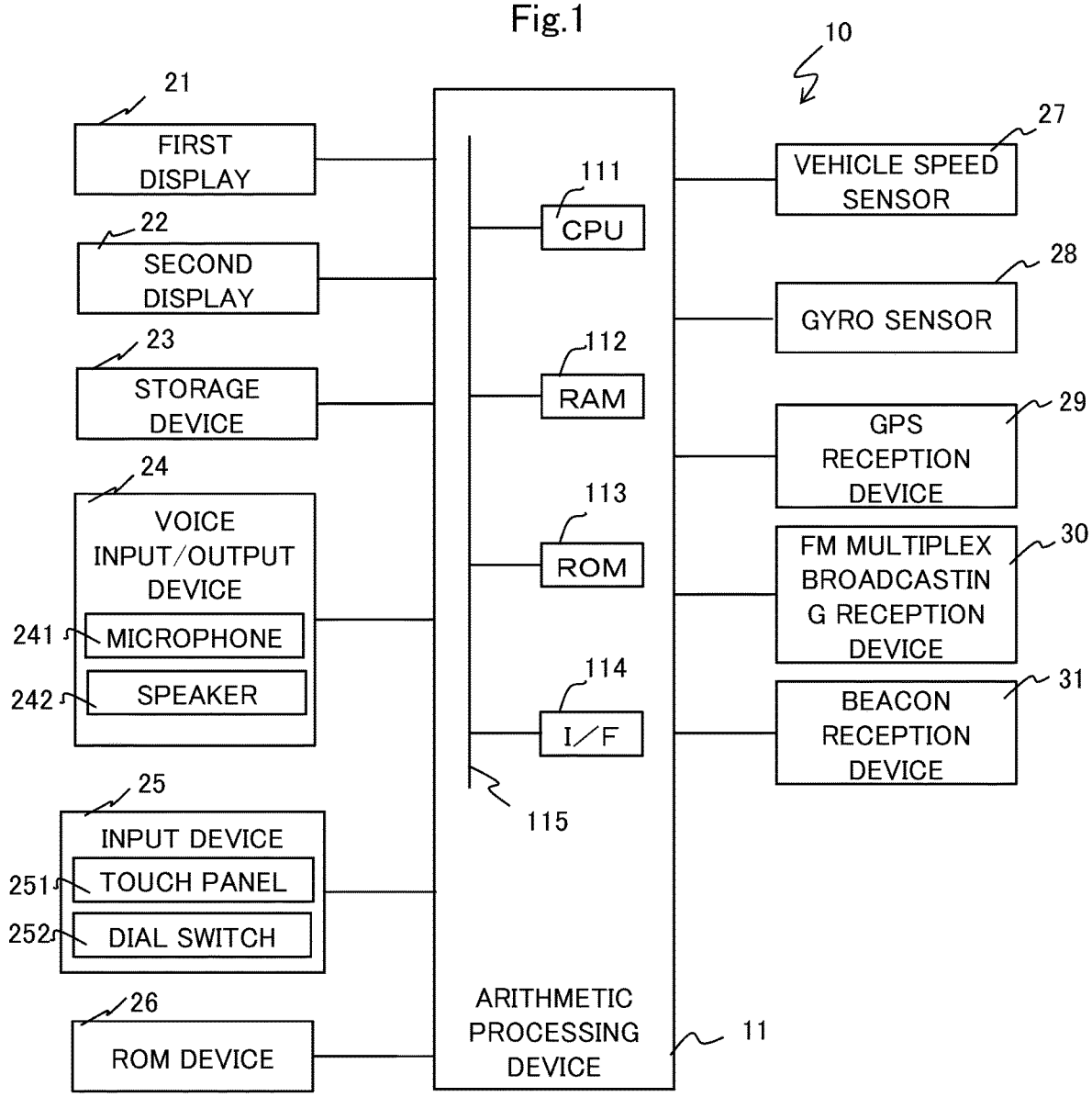

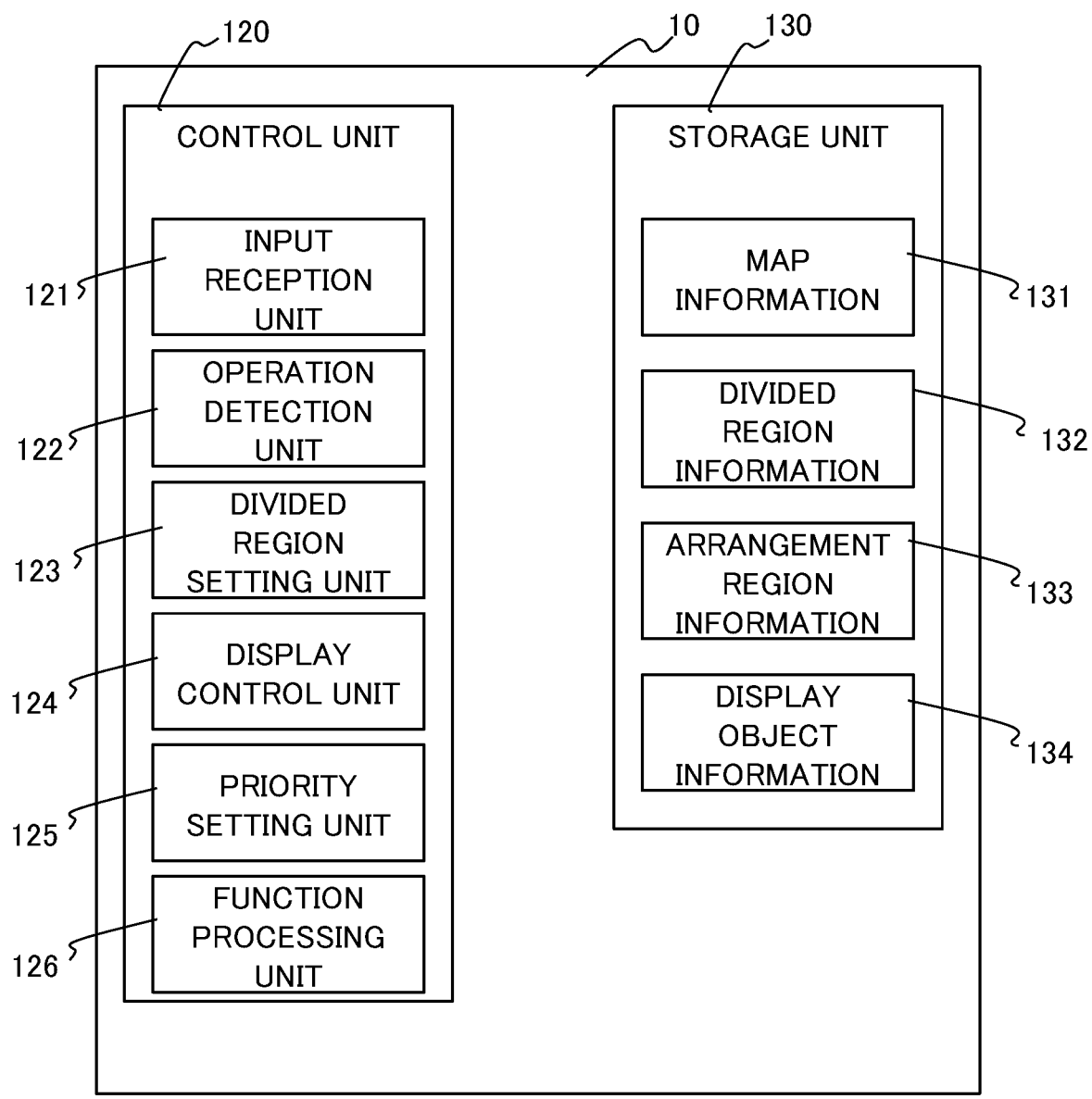

Fig. 6
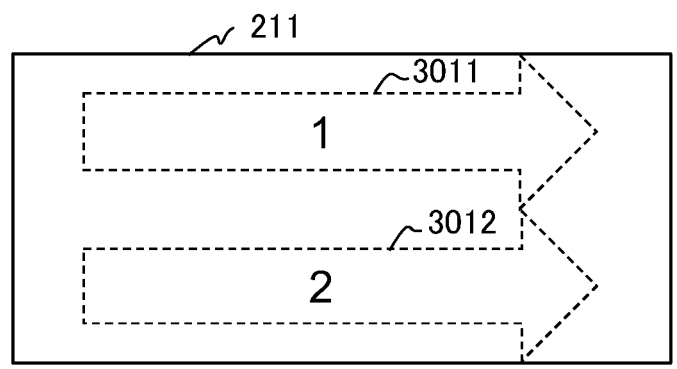
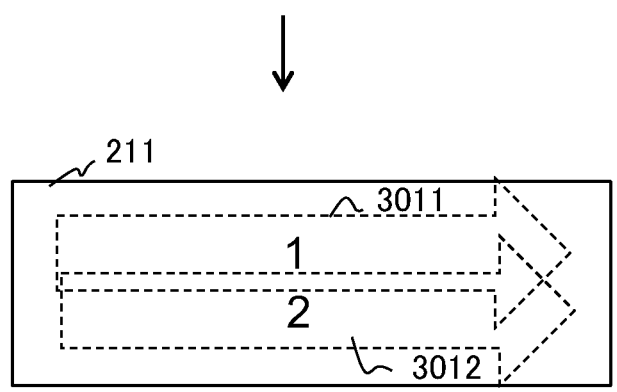

Fig. 16
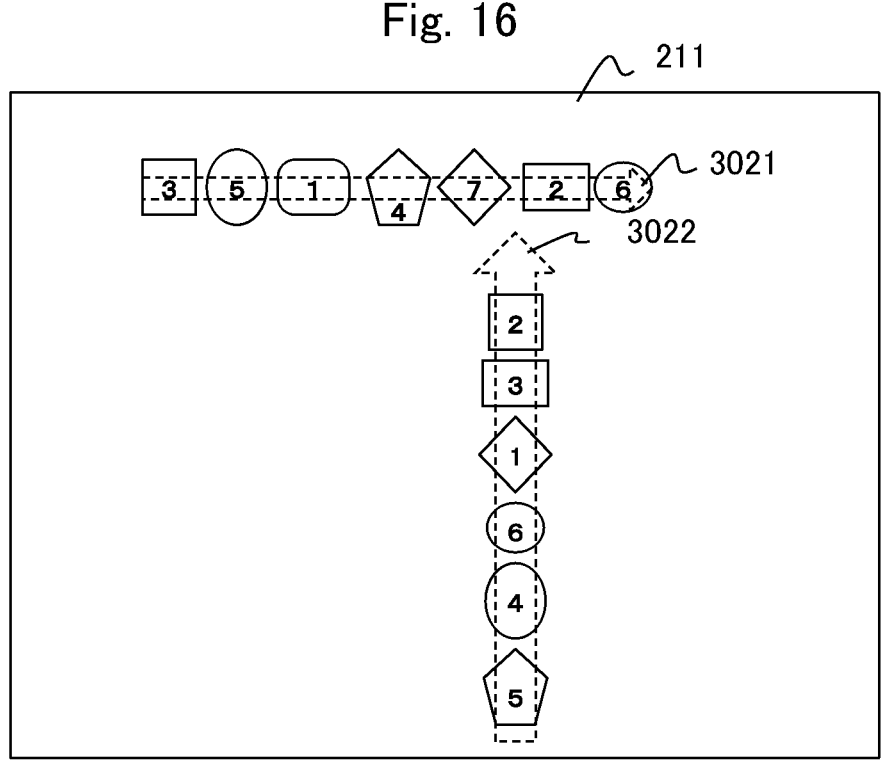
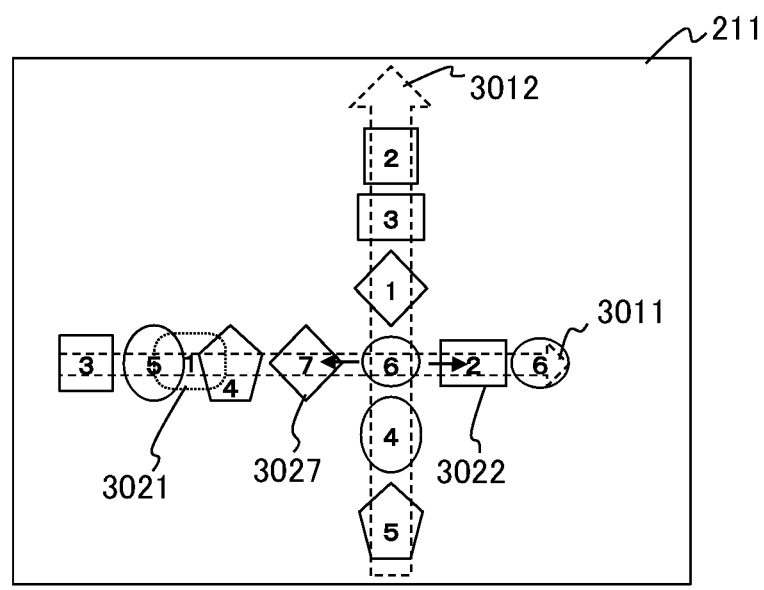

DISPLAY CONTROL DEVICE AND DISPLAY CONTROL METHOD FOR PREVENTING OVERLAPPING OF HIGH PRIORITY DISPLAY REGIONS

TECHNICAL FIELD

The present invention relates to a display control device and a display control method. The present invention claims priority to Japanese Patent Application No. 2018-240711, filed on Dec. 25, 2018, the contents of which are incorporated by reference herein in its entirety in designated states where the incorporation of documents by reference is approved.

BACKGROUND ART

As an invention relating to information display on a display, for example, PTL 1 discloses an electronic device including a display unit that performs display on a display region, an operation detection unit that detects an operation with respect to the display region, and a display control unit that controls the display unit. Further, PTL 1 describes that "the display control unit has a division display mode in which a first display region included in the display region is divided into a plurality of divided regions and display of each of the plurality of divided regions is independently controlled. In the division display mode, the display control unit causes the display unit to display one operation target image that enables setting for each of the plurality of divided regions".

CITATION LIST

Patent Literature

PTL 1: JP 2015-87861 A

SUMMARY OF INVENTION

Technical Problem

As described in PTL 1, it has hitherto been possible to divide a display region into a plurality of divided regions and independently control display of each of the divided regions. Specifically, when a size of a divided region is changed, it is possible to simply downsize or upsize a display object such as an icon displayed on the divided region, change a layout in a stepwise manner, perform trimming partially, or hide the display object. However, display change of the display object described above when the size of the divided region is changed is not sufficiently in conformity with dynamic change in size of the divided region. Thus, it is difficult to say that optimal display of the display object is provided.

The present invention has been made in view of such circumstances, and has an object to enable display of display objects to be changed more appropriately in conformity with dynamic change in size of a plurality of divided regions provided on a display screen.

Solution to Problem

The present application includes a plurality of solutions to at least a part of the problems described above. One example of the solutions is as follows.

In order to solve the above-mentioned problem, a display control device according to one aspect of the present invention includes a divided-region setting unit configured to dynamically change a size of a divided region provided on a screen, in accordance with an operation from a user; a display control unit configured to provide arrangement regions on the divided region and change a relative positional relationship between the arrangement regions provided on the same divided region in conformity with change in size of the divided region, each of the arrangement regions on which at least one or more display objects are arranged; and a priority setting unit configured to set relative priority with respect to the arrangement regions provided on the same display region, wherein, in a case where the relative positional relationship between the arrangement regions provided on the same divided region is changed, which causes the arrangement regions to overlap at least partially with each other, the display control unit controls display of the display objects in a unit of arrangement region, based on the priority set for each of the arrangement regions.

Advantageous Effects of Invention

According to one aspect of the present invention, display of the display objects can be changed more appropriately in conformity with dynamic change in size of the plurality of divided regions provided on the display screen.

Note that problems, configurations, and effects other than those described above will become apparent in the following description of the embodiments.

BRIEF DESCRIPTION OF DRAWINGS

FIG. 1 is a block diagram illustrating a configuration example of an onboard device according to one embodiment of the present invention.

FIG. 2 is a diagram illustrating one example of a functional block of the onboard device.

FIG. 3A is a diagram illustrating a first display example, FIG. 3B is a diagram illustrating a second display example, and FIG. 3C is a diagram illustrating a third display example.

FIG. 6 is a diagram for describing an overview of change in setting of the arrangement region in conformity with change in size of the divided region.

FIG. 10A is a diagram illustrating an example in which the arrangement region is defined by a linear function, FIG. 10B is a diagram illustrating an example in which the arrangement region is defined by an elliptic function, FIG. 10C is a diagram illustrating an example in which the arrangement region is defined by two different linear functions, and FIG. 10D is a diagram illustrating an example in which the arrangement region is defined by two different elliptic functions.

FIG. 16 is a diagram for describing an example of moving display objects arranged on an arrangement region with lower priority.

DESCRIPTION OF EMBODIMENTS

Figure 3A:
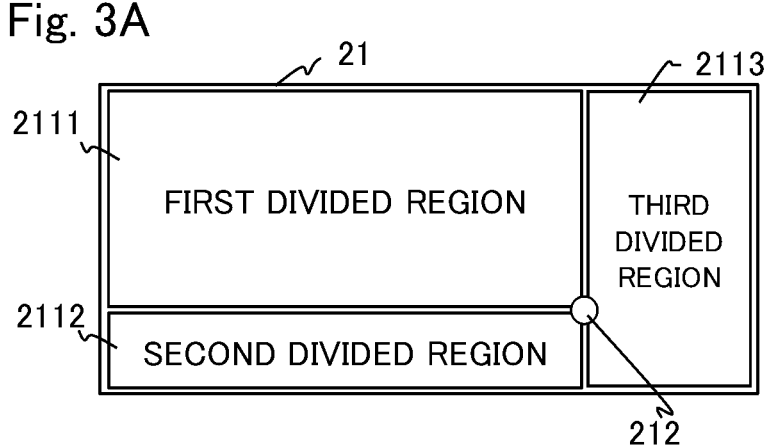
FIG. 3A to FIG. 3C are display examples of divided regions that are set on a display screen of a first display.

With reference to the drawings, one embodiment of the present invention is described below. Note that, in all the drawings for describing the embodiment, in principle, the identical members are denoted with the identical reference symbols, and repeated description therefor is omitted as appropriate. In the following embodiment, it goes without saying that constituent elements therein (including element steps and the like) are not necessarily essential unless otherwise particularly stated or incontrovertibly considered as essentials in principle. When the expressions "constituted of A", "being formed of A", "including A", and "comprising A" are given, it goes without saying that the expressions are not intended to exclude elements other than A unless A otherwise is clearly stated as the only element. Similarly, in the following embodiment, when shapes, positional relationships, and the like of the constituent elements and the like are referred to, substantially approximate or similar shapes and the like are included unless otherwise particularly stated or incontrovertibly considered to be different in principle or the like.

<Configuration Example of Onboard Device 10 According to One Embodiment of Present Invention>

The onboard device 10 according to one embodiment of the present invention is described below. The onboard device 10 corresponds to a display control device according to the present invention.

FIG. 1 illustrates a configuration example of the onboard device 10 according to one embodiment of the present invention. The onboard device 10 can be implemented with an onboard navigation device having a navigation function, for example. Thus, the onboard device 10 is, for example, a box-like device including a first display 21 on a front surface, and is housed in a console panel inside a vehicle. The onboard device 10 may include a mounting tool (bracket) to be mounted to the console panel, and may be mounted, for example, above the console panel inside the vehicle through intermediation of the mounting tool.

Here, the navigation function refers to a function that a navigation device usually has such as displaying map information, searching for a recommended route, and navigating from a departure place (or a current place) to a target place, and displaying traffic information. Note that the onboard device 10 is not limited to a dedicated navigation device, and may be, for example, a smartphone, a tablet terminal device, and a personal data assistance (PDA). In this case, the navigation function is provided by an application installed in those devices or a server device to which those devices can connect.

The onboard device 10 can display, in addition to a navigation screen relevant to the navigation function, an air-conditioning screen for setting a temperature, an air flow rate, and the like of an air-conditioner, an audio screen for selecting audio and setting a sound volume and the like, a screen for an application executed by a smartphone that is wirelessly connected, a telephone screen for outgoing and incoming calls, and the like.

The onboard device 10 includes an arithmetic processing device 11, the first display 21, a second display 22, a storage device 23, a voice input/output device 24, an input device 25, and a read only memory (ROM) device 26.

The onboard device 10 further includes a vehicle speed sensor 27, a gyro sensor 28, a global position system (GPS) reception device 29, a frequency modulation (FM) multiplex broadcasting reception device 30, and a beacon reception device 31.

The arithmetic processing device 11 is a central unit that performs various types of processing of the onboard device 10. The arithmetic processing device 11 detects a current place through use of information output from various sensors such as the vehicle speed sensor 27, and the GPS reception device 29, for example. Based on the acquired current place information, the arithmetic processing device 11 reads map information required for display from the storage device 23 and the ROM device 26. The arithmetic processing device 11 develops the read map information into graphics and overlaps a mark indicating the current place thereon, to generate and output an image signal to be displayed on the first display 21. The arithmetic processing device 11 further calculates a recommended route connecting a departure place and a target place that are instructed from a user (a driver or a passenger), through use of map information and the like stored in the storage device 23 or the ROM device 26. The arithmetic processing device 11 navigates along the route by outputting a predetermined signal to a speaker 242 and the first display 21.

The arithmetic processing device 11 can set a plurality of divided regions on a display screen of the first display 21, and can change sizes of the divided regions in accordance with an operation from a user. The arithmetic processing device 11 displays a predetermined display object (icon and the like) in a predetermined display form independently in each divided region. Moreover, the arithmetic processing device 11 can also display contents in a freely-selected divided region(s) among the plurality of divided regions, which are set in the first display 21, on the second display 22.

The arithmetic processing device 11 as described above includes a central processing unit (CPU) 111 that executes various types of processing for performing arithmetic operations and controlling each of the devices, a random access memory (RAM) 112 that temporarily stores map information, arithmetic data, and the like having been read from a memory device such as the storage device 23 and a ROM 113, the ROM 113 that stores a boot program and the like executed by the CPU 111, an interface (I/F) 114 for connecting various types of hardware to the arithmetic processing device 11, and a bus 115 that connects those components to each other.

The first display 21 is installed at the center of the console panel provided on the front surface inside the vehicle, for example. The first display 21 is a unit that displays graphics information. The first display 21 is formed of a liquid crystal display, an organic electroluminescence (EL) display, or the like, for example. Note that, as described later, a transparent touch panel 251 is layered on the first display 21. Therefore, a user can perform a touch operation on (the touch panel 251 layered on) the first display 21. However, an operation on the first display 21 may also be performed through use of a dial switch 252.

The second display 22 is installed in an instrument panel provided in front of a driver's seat, for example. For example, in a case of a vehicle in which a steering wheel is installed on a left side as in a US specification vehicle, the second display 22 is set on a left side to the first display 21 installed at the center of the console panel as seen from a user.

Note that, it is desired that a display for displaying a speed indicator, a tachometer, and the like, the display being provided to the vehicle in advance, be also used for the second display 22. As a matter of course, the second display 22 dedicated to the onboard device 10 may be provided. The second display 22 is a unit that displays graphics information. The second display 22 is formed of a liquid crystal display, an organic EL display, or the like, for example.

The storage device 23 is formed of a storage medium capable of performing at least reading and writing, such as a hard disk drive (HDD) and a non-volatile memory card. Various pieces of information used by the arithmetic processing device 11 are stored in the storage device 23, for example.

The voice input/output device 24 includes a microphone 241 as a voice input device and the speaker 242 as a voice output device. The microphone 241 collects voice or sound outside the onboard device 10 in addition to voice that is made by a driver or a passenger (user utterance). The speaker 242 outputs voice or sound such as route guidance and the like for a driver and the like, which is generated by the arithmetic processing device 11.

The input device 25 is a device that receives an instruction input from a user. The input device 25 includes the touch panel 251, the dial switch 252, a scroll key being another hard switch, and the like (not illustrated). The input device 25 outputs information in accordance with an operation of the keys and switches to another device such as the arithmetic processing device 11.

The touch panel 251 is formed of a transparent material, and is layered on the display screen of the first display 21. The touch panel 251 detects a touch operation by a finger of a user or a touch pen (touch-on (contact), dragging (move in a contact state), and touch-off (release of contact)). Thus, while visually recognizing the display screen of the first display 21, a user can input various operations by touching the display screen (actually, the touch panel 251). A position of a touch operation of a user is specified based on an x-y coordination set on the touch panel 251, for example. The touch panel 251 is formed of input detection elements of a capacitive sensing type, for example.

The ROM device 26 is formed of a storage medium capable of performing at least reading, such as a ROM exemplified by a compact disk (CD)-ROM and a digital versatile disk (DVD)-ROM and an integrated circuit (IC) card. Video data, voice data, and the like are stored in the storage medium, for example.

The vehicle speed sensor 27 is a sensor that acquires a value used for calculation of a vehicle speed. The gyro sensor 28 is a sensor that is formed of an optical fiber gyroscope, an oscillation gyroscope, or the like, and detects angular velocity of rotation of a moving body (vehicle). The GPS reception device 29 can measure a current place, a traveling speed, and a traveling direction of the moving body by receiving signals from GPS satellites and measuring distances between the moving body and the GPS satellites and rates of change of the distances with respect to three or more satellites. Those devices are used for the arithmetic processing device 11 in order to detect a current place of a vehicle to which the onboard device 10 is mounted.

The FM multiplex broadcasting reception device 30 receives FM multiplex broadcasting that is transmitted through use of an FM broadcasting wave. FM multiplex broadcasting includes an outline of current traffic information relating to vehicle-information-and-communication-system (VICS) information, regulation information, service area/parking area (SA/PA) information, parking lot information, weather information, character information as general FM multiplex information, and the like.

The beacon reception device 31 receives an outline of current traffic information relating to VICS information, regulation information, service area/parking area (SA/PA) information, parking lot information, weather information, an emergency alert, and the like. The beacon reception device 31 may be, for example, an optical beacon that performs communication through light or a radio wave beacon that performs communication through a radio wave.

Next, a functional block indicating a functional configuration of the onboard device 10 is described. FIG. 2 illustrates one example of a functional block of the onboard device 10.

The onboard device 10 includes a control unit 120 and a storage unit 130.

The control unit 120 includes an input reception unit 121, an operation detection unit 122, a divided-region setting unit 123, a display control unit 124, a priority setting unit 125, and a function processing unit 126.

The input reception unit 121 is a function block that receives an instruction and an input of information from a user through the dial switch 252 of the input device 25 or other hard switches. For example, the input reception unit 121 receives setting of a departure place and a target place, a search instruction for a recommended route, and the like through the input device 25 from a user.

The operation detection unit 122 is a function block that detects a touch operation made by a user with respect to the touch panel 251 of the input device 25. Specifically, the operation detection unit 122 detects touch-on, dragging, and touch-off with respect to the touch panel 251. The operation detection unit 122 specifies an x-y coordination on the touch panel 251 subjected to a touch operation.

The operation detection unit 122 can also detect a plurality of (for example, two) touches on the touch panel 251 within a predetermined time period (for example, 0.5 seconds), and can specify an x-y coordination on the touch panel 251 which indicates each touch position.

When detecting a touch operation (including touch-off), the operation detection unit 122 notifies the divided-region setting unit 123 and the function processing unit 126 of a type and an x-y coordination of the touch operation.

The divided-region setting unit 123 is a function block that sets divided regions on the display screen. Specifically, the divided-region setting unit 123 sets a division state (a position and a size) of a plurality of divided regions obtained by dividing the display screen of the first display 21, based on notification from the operation detection unit 122. Note that, in the present embodiment, description is made on an example in which the display screen is divided into three regions, but the number of divisions may be one, two, or four or more. The divided-region setting unit 123 may not divide the display screen, and may display only one region on the display screen. In this case, the one region present on the display screen is only required to be regarded as a divided region. In other words, in the present embodiment, the divided region may be described as a variable-sized display region provided for displaying a specific display object on the display screen.

The display control unit 124 is a function block that controls setting of an arrangement region and display of display objects for each of the divided regions. The display control unit 124 changes a size and a position of the arrangement region, attribute information, and the like in accordance with change in size of the divided region. The display control unit 124 changes positions of the display objects arranged on the arrangement region and attribute information in accordance with the change in size of the arrangement region.

The priority setting unit 125 is a function block that sets priority with respect to the arrangement region provided on the divided region and the display objects arranged on the arrangement region. The priority setting unit 125 can set an initial value determined in advance as priority with respect to the arrangement region and the display objects, and can change priority in accordance with an input from a user afterward.

The priority setting unit 125 may learn a situation where change is made to priority, and may change priority dynamically based on a learning result. Here, the situation refers to a state of information that can be acquired by the onboard device 10, such as a current place, a traveling speed, a traffic condition, a temperature, weather, a time range, and the like of a vehicle to which the onboard device 10 is mounted. Specifically, for example, at a predetermined time range, an arrangement region or a display object corresponding to an air-conditioning function may be high in priority.

Note that, when priority is changed, the arrangement region and the display of the display objects based on priority may be dynamically changed. The priority setting unit 125 updates arrangement region information 133, based on priority set among the arrangement regions, and updates display object information 134, based on priority set among the display objects.

The function processing unit 126 is a function block that executes processing for achieving predetermined functions in accordance with a touch operation from a user with respect to an operation reception button displayed on the divided region of the first display 21. The functions referred herein include, for example, a navigation function, an air-conditioning function, reproduction of music, outgoing and incoming telephone calls, and the like.

The storage unit 130 is a function block that stores predetermined information. The storage unit 130 is implemented with the ROM 113 and the storage device 23. Various types of information such as map information 131, divided-region information 132, the arrangement region information 133, the display object information 134, and others are stored in the storage unit 130.

Information on land forms, roads, and the like that are used for the navigation function is recorded as the map information 131.

Division states of the divided regions provided on the display screen of the first display 21 are recorded as the divided-region information 132.

A shape, a size, a position, and attribute information (including priority) of the arrangement region provided on each of the divided regions are recorded as the arrangement region information 133.

Data and attribute information (including priority) with respect to the display objects (an icon, an image, a text, a pop-up, a list, and the like as operation reception buttons) displayed on the entire screen region or each of the divided regions are recorded as the display object information 134.

Note that the functional blocks of the onboard device 10, which are the input reception unit 121, the operation detection unit 122, the divided-region setting unit 123, the display control unit 124, the priority setting unit 125, and the function processing unit 126, are implemented by the CPU 111 executing predetermined programs. The programs are stored in the ROM 113 of the onboard device 10 or the storage device 23, and are loaded on the RAM 112 at the time of execution and executed by the CPU 111.

Each functional block illustrated in FIG. 2 is classified according to its main processing contents, for the sake of easier understanding of the functions of the onboard device 10 implemented in the present embodiment. Therefore, how each function is classified and referred to does not limit the present invention. Each configuration of the onboard device 10 can be classified into more components, according to the processing contents. Each configuration can be classified so that one component executes more processing.

All or a part of the functional blocks may be constituted by hardware (an integrated circuit such as an ASIC, or the like) implemented in a computer. Processing of each of the functional blocks may be executed by one piece of hardware, or may be executed by a plurality of pieces of hardware.

<Regarding Divided Regions on Display Screen of First Display 21>

Next, divided regions set on the display screen of the first display 21 are described. As described above, the onboard device 10 causes the divided-region setting unit 123 to divide the display screen of the first display 21, and thus a plurality of (in the present embodiment, three) divided regions can be provided.

Figure 3B:
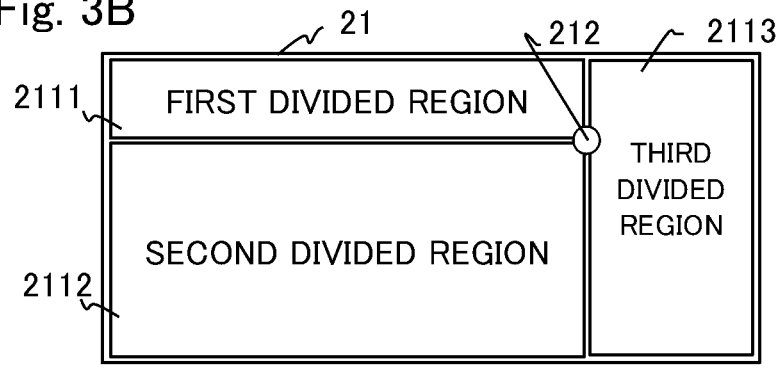
Figure 3C:
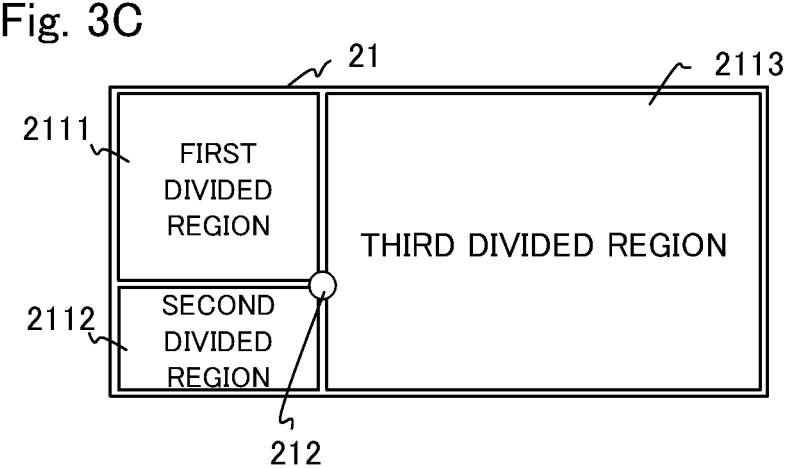

FIGS. 3A to 3C are display examples of three divided regions 211 (a first divided region 2111, a second divided region 2112, and a third divided region 2113) that are set on the display screen of the first display 21. FIG. 3A illustrates a first display example, FIG. 3B illustrates a second display example, and FIG. 3C illustrates a third display example.

For example, a navigation screen, an air-conditioning screen, an audio screen, an application (App) screen, a telephone screen, or the like can be allocated to each of the divided regions 211. A plurality of operation reception buttons relating to different functions (for example, air-conditioning, audio, and telephone) may be mixed and displayed on one divided region 211.

When the plurality of divided regions 211 are provided on the display screen of the first display 21, a pointer 212 is displayed on the display screen. When a user touches on and drags the pointer 212, the divided-region setting unit 123 dynamically changes a size of each of the divided regions 211 on the display screen. Further, when the user touches off the pointer 212, the divided-region setting unit 123 fixes a size of each of the divided regions 211.

For example, under a state of FIG. 3A, when a user touches on the pointer 212 and drags it upward, the divided-region setting unit 123 dynamically changes each of the divided regions 211 to a state of FIG. 3B, by extending a vertical width of the second divided region 2112 and reducing a vertical width of the first divided region 2111 by the same amount.

For example, under the state of FIG. 3B, when a user touches on the pointer 212 and drags it in a lower left direction, the divided-region setting unit 123 dynamically changes each of the divided regions 211 to a state of FIG. 3C, by extending a lateral width of the third divided region 2113 and reducing lateral widths of the first divided region 2111 and the second divided region 2112 by the same amount while extending the vertical width of the first divided region 2111 and reducing the vertical width of the second divided region 2112 by the same amount.

Note that, the divided-region setting unit 123 dynamically changes a state of each of the divided regions 211. In response to this, the display control unit 124 dynamically changes display of display objects 302 (FIG. 11) arranged on each of the divided regions 211. Details thereof are described later.

However, a division state of each of the divided regions 211 provided on the display screen of the first display 21 is not limited to the display examples in FIG. 3A to FIG. 3C, and is freely changed in accordance with an operation from a user.

Not only the touch panel 251 but also the dial switch 252 can be used for reception of an operation of a user with respect to the pointer 212 on the display screen.

<Regarding Arrangement Regions 301 Provided on Divided Region 211>

Figure 4:
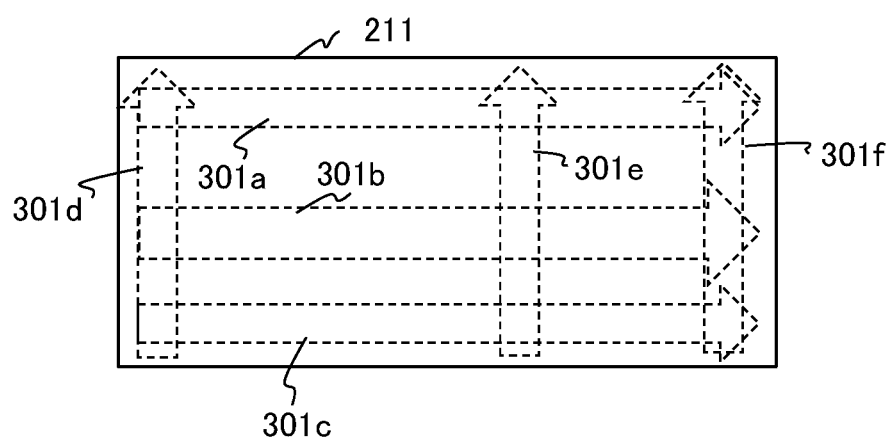
FIG. 4 is a diagram illustrating an example of an arrangement region that is set on a divided region.

Next, arrangement regions 301 provided on each of the divided regions 211 are described. FIG. 4 illustrates one example of a plurality of arrangement regions 301a to 301f provided on the divided region 211.

Each of the arrangement regions 301a to 301f is a region for arranging display objects such as an operation reception button, various icons, a thumbnail image, and text information. Note that, in the drawing, positions of the arrangement regions 301a to 301f on the divided region 211 are indicated with broken lines, but indication of the arrangement regions 301 are not actually displayed on the screen.

In the example in FIG. 4, the arrangement regions 301a, 301b, and 301c that extend in a lateral direction and the arrangement regions 301d, 301e, and 301f that extend in a vertical direction are provided on the divided region 211. In the following description, when there is no need to distinguish the arrangement regions 301a to 301f from one another, the arrangement region 301 is simply referred to.

A two, or three or more dimensional coordinate system independent from the x-y coordination system provided on the display screen of the first display 21 is provided on the arrangement region 301. With this, display of the display objects 302 on each of the arrangement regions 301 can be changed easily. When a two-dimensional coordination system is provided on the arrangement region 301, the arrangement region 301 has an area. When a three-dimensional coordination system is provided on the arrangement region 301, the arrangement region 301 has a volume.

The arrangement regions 301 have axes (all of which are not illustrated) each having a direction (vector) extending from one end (start point) to the other end (end point) of the region (hereinafter, referred to as directional axes). The directional axes of the arrangement regions 301 are not limited to linear lines parallel to the lateral direction or the vertical direction of the divided regions 211, and may be linear lines in an oblique direction. The directional axes are not limited to linear lines, and may be curved lines.

The arrangement regions 301 each have a rectangular shape, for example. However, in FIG. 4, in order to indicate the directions of the directional axes, the arrangement regions 301 are illustrated as arrow regions. Note that the arrangement regions 301 are not limited to rectangular shapes, and may have other shapes. Other examples of the shapes of the arrangement regions 301 are described later with reference to FIGS. 10A to 10D.

Hereinafter, a length of the directional axis of the arrangement region 301 is referred to as a directional-axis length, and a length in a direction orthogonal to the directional axis of the arrangement region 301 is referred to as a width.

In accordance with change in size of the divided region 211, the arrangement region 301 is changed in size and position while maintaining the direction of the directional axis and width. A maximum value can be set for the directional-axis length of the arrangement region 301.

The display control unit 124 can set, for the arrangement region 301, an offset value indicating a distance from an end of the divided region 211 to the arrangement region 301, in accordance with an operation from a user. Moreover, the display control unit 124 can set, for the arrangement region 301, an offset value indicating a distance from an end of the divided region 211 to the arrangement region 301, in accordance with the width thereof. For example, for the arrangement region 301c, which is adjacent to the lower side of the divided region 211 and extends in the lateral direction, the display control unit 124 can set an offset value from the lower side, in accordance with the width of the arrangement region 301c. Similarly, for the arrangement region 301a, which is adjacent to the upper side of the divided region 211 and extends in the lateral direction, the display control unit 124 can set an offset value from the upper side, in accordance with the width of the arrangement region 301a. For the arrangement region 301d, which is adjacent to the left side of the divided region 211 and extends in the vertical direction, the display control unit 124 can set an offset value from the left side, in accordance with the width of the arrangement region 301d. Similarly, for the arrangement region 301f, which is adjacent to the right side of the divided region 211 and extends in the vertical direction, the display control unit 124 can set an offset value from the right side, in accordance with the width of the arrangement region 301f.

The arrangement regions 301 may be set to be visible or invisible as attribute information. The display objects 302 (FIG. 11) arranged on the arrangement region 301 set to be visible are displayed on the screen. In contrast, the display objects 302 (FIG. 11) arranged on the arrangement region 301 set to be invisible are not displayed on the screen.

The arrangement region 301 may be set to have priority relative to other arrangement regions 301 provided on the same divided region 211 as attribute information. Note that, in the present embodiment, a greater value of priority of the arrangement region 301 indicates a higher priority order. The value of priority of the arrangement region 301 is set to an initial value determined in advance by the priority setting unit 125. Regarding priority of the arrangement region 301, priority may be changed in accordance with an operation from a user. Further, the priority setting unit 125 may learn a situation where change is made to priority, and may change priority dynamically in accordance with a learning result.

As attribute information, the arrangement region 301 may be set whether or not interference occurs in a case where the arrangement region 301 overlaps at least partially with other arrangement regions 301 provided on the same divided region 211. The interference indicates that attribute information relating to the arrangement region 301 with lower priority is changed from visible to invisible and is removed from the screen. In the following description, an action of changing attribute information from visible to invisible for removal from the screen is also referred to as "weeding-out".

For example, the arrangement regions 301 having the directional axes parallel to each other (for example, the arrangement region 301a and the arrangement region 301b) can be set as "to be interfered", and the arrangement regions 301 having the directional axes intersecting each other (for example, the arrangement region 301a and the arrangement region 301d) can be set as "not to be interfered".

<Change in Setting of Arrangement Region 301 in Conformity with Change in Size of Divided Region 211>

Next, change in setting of the arrangement region 301 in conformity with change in size of the divided region 211 is described.

Figure 5:
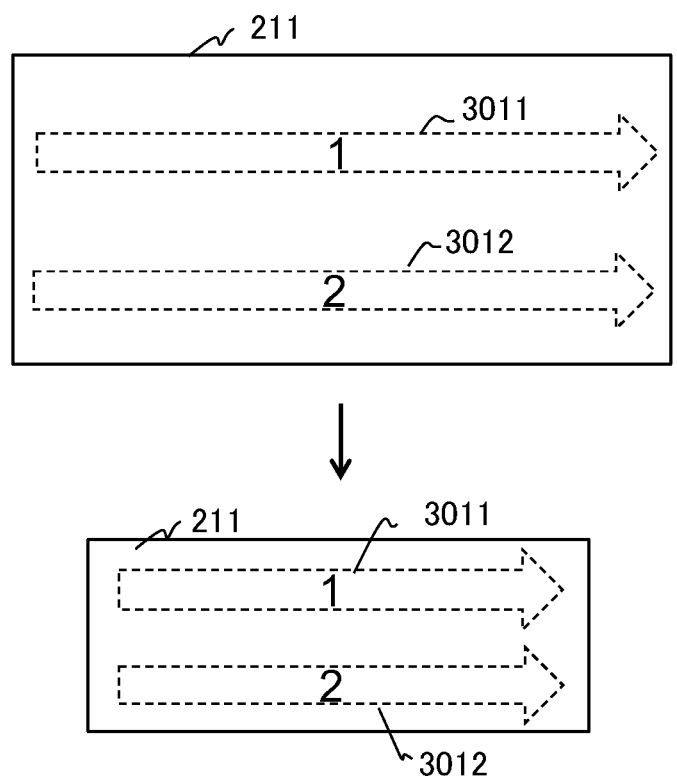
FIG. 5 is a diagram for describing an overview of change in setting of the arrangement region in conformity with change in size of the divided region.

Each of FIG. 5 and FIG. 6 is a diagram for describing an overview of change in setting of arrangement regions 3011 and 3012 provided on the divided region 211, in conformity with change in size of the divided region 211.

In the examples of FIG. 5 and FIG. 6, on the divided region 211, the arrangement regions 3011 and 3012 being different in priority are provided. Each number denoted to the arrangement region 301 is a value indicating priority, and a larger number indicates higher priority. Therefore, priority of the arrangement region 3011 is 1, and priority of the arrangement region 3012 is 2. Thus, the arrangement region 3012 has priority higher than priority of the arrangement region 3011. In the example of FIG. 6, the widths of the arrangement regions 3011 and 3012 are set to be wider than those in the example of FIG. 5.

In the examples of FIG. 5 and FIG. 6, when the size of the divided region 211 is changed from a state in the upper row to a state in the lower row in accordance with an operation from a user, the directional-axis lengths of the arrangement regions 3011 and 3012 are reduced under a state of maintaining the direction of the directional axes and widths. The interval between the arrangement regions 3011 and 3012 is narrowed.

As a result, in the example of FIG. 5, the arrangement region 3011 and the arrangement region 3012 do not overlap each other even partially, and hence the arrangement region 3011 is not weeded out.

Meanwhile, in the example of FIG. 6, the arrangement region 3011 and the arrangement region 3012 partially overlap each other. Thus, attribute information relating to the arrangement region 3011 having lower priority is changed from visible to invisible, and the arrangement region 3011 is weeded out in a unit of arrangement region. In other words, all the display objects 302 (not illustrated) arranged on the arrangement region 3011 are collectively removed from the screen.

However, as in the example of FIG. 5, even when the arrangement region 3011 and the arrangement region 3012 do not partially overlap each other, in a case where the divided region 211 is reduced to a size smaller than a predetermined size, the arrangement region 3011 having lower priority may be weeded out.

Note that, instead of weeding out the arrangement region 3011 having lower priority in a unit of arrangement region, the display objects arranged on the arrangement region 3011 may be set to be moved. Details thereof are described later with reference to FIG. 16.

In contrast, in the examples of FIG. 5 and FIG. 6, when the size of the divided region 211 is changed from the state in the lower row to the state in the upper row in accordance with an operation from a user, the directional-axis lengths of the arrangement regions 3011 and 3012 are extended under a state of maintaining the direction of the directional axes and widths. The interval between the arrangement regions 3011 and 3012 is broadened.

As a result, in the example of FIG. 6, partial overlapping between the arrangement region 3011 and the arrangement region 3012 is canceled. Thus, attribution information relating to the arrangement region 3011 having lower priority is changed from invisible to visible, and display of the display objects 302 (not illustrated) arranged on the arrangement region 3011 is restored.

As described above, when the arrangement region 3011 and the arrangement region 3012 overlap each other, one of them is weeded out in accordance with priority. Thus, redundant determination on the display objects arranged on the arrangement regions 3011 and 3012 can be omitted.

Note that the priority setting unit 125 may dynamically change priority of the plurality of arrangement regions 301 provided on the same divided region 211, from the initial value set in advance. Specifically, for example, the priority setting unit 125 may set a greater value of priority for the arrangement region 301 with the display objects 302 arranged on the arrangement region 301 (FIG. 11) on which an operation from a user is performed more recently. For example, a value of priority may be set greater for the arrangement region 301 with the display objects 302 being arranged thereon (FIG. 11) on which an operation from a user is performed more frequently. In this manner, the display objects 302 that are more likely to be operated from a user are displayed preferentially, and hence user operability can be improved.

<Specific Examples of Change in Setting of Arrangement Region 301 in Conformity with Change in Size of Divided Region 211>

Next, specific examples of change in setting of the arrangement region 301 in conformity with change in size of the divided region 211 are described with reference to FIG. 7 to FIG. 9.

Figure 7:
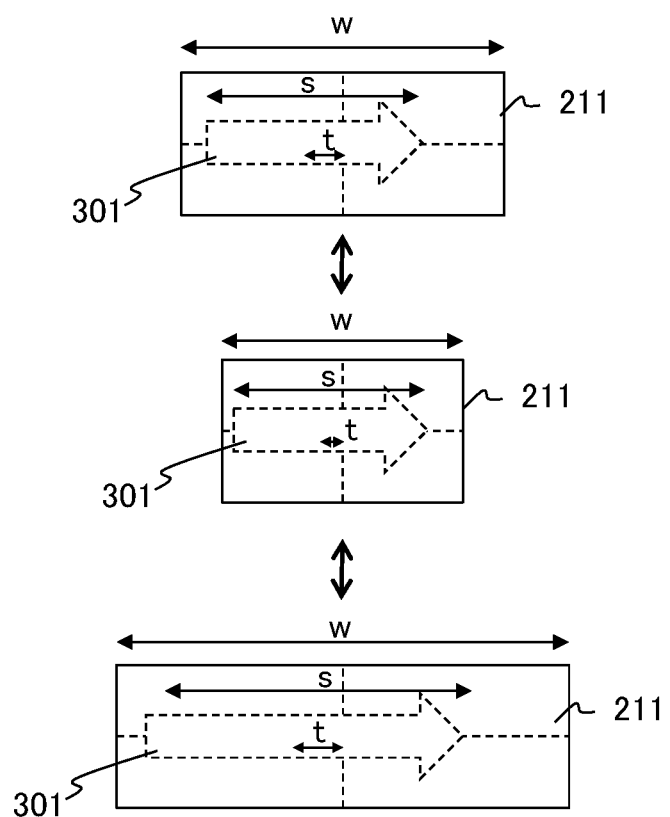
FIG. 7 is a diagram illustrating a first specific example of change in setting of the arrangement region in conformity with change in size of the divided region.

FIG. 7 illustrates a first specific example of change in setting of the arrangement region 301 in conformity with change in size of the divided region 211. In FIG. 7, the lateral width of the divided region 211 is denoted with w, the directional-axis length of the arrangement region 301 is denoted with s, and the distance between the center of the divided region 211 and the center of the arrangement region 301 is denoted with t. The same is applied in FIG. 8 and FIG. 9 described later.

In the first specific example, in such a way that the ratio s/w of the directional-axis length s to the lateral width w of the divided region 211 and the ratio t/w of the distance t to the lateral width w of the divided region 211 are constant, setting of the arrangement region 301 is changed in conformity with change in size of the divided region 211 while maintaining the direction and width of the directional axis of the arrangement region 301.

Figure 8:
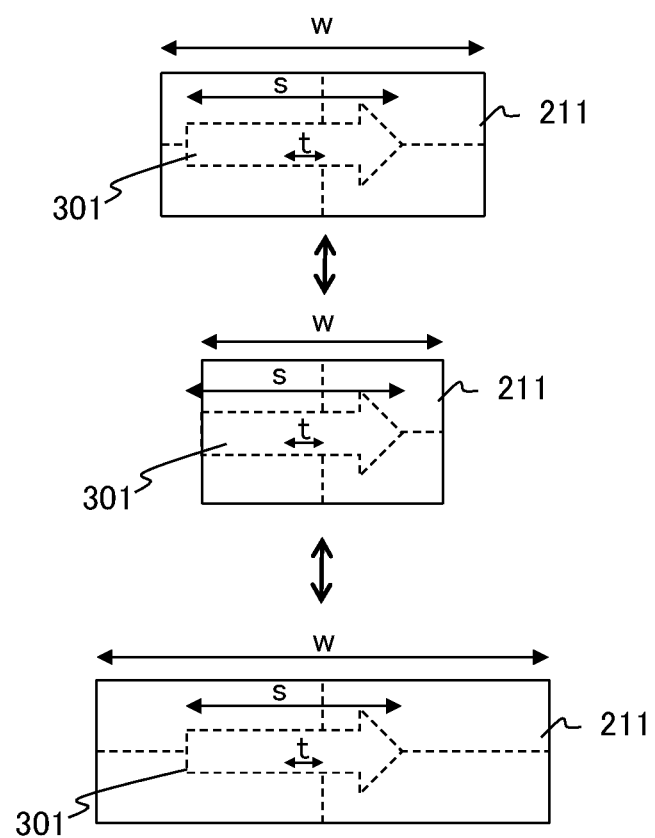
FIG. 8 is a diagram illustrating a second specific example of change in setting of the arrangement region in conformity with change in size of the divided region.

Next, FIG. 8 illustrates a second specific example of change in setting of the arrangement region 301 in conformity with change in size of the divided region 211.

In the second specific example, setting of the arrangement region 301 is changed in conformity with change in size of the divided region 211 while maintaining the direction of the directional axis and width of the arrangement region 301, under a state in which the directional-axis length s and the distance t are fixed irrespective of change of the lateral width w of the divided region 211. However, as illustrated in the middle row of FIG. 8, when a part of the arrangement region 301 ranges out over the divided region 211, the directional-axis length of the arrangement region 301 is reduced by an over-ranging amount.

Figure 9:
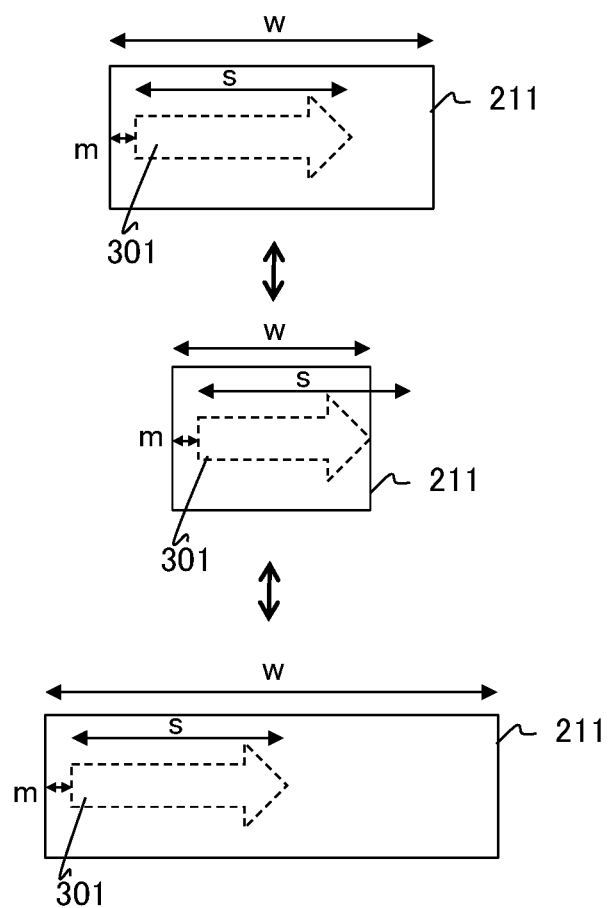
FIG. 9 is a diagram illustrating a third specific example of change in setting of the arrangement region in conformity with change in size of the divided region.

Next, FIG. 9 illustrates a third specific example of change in setting of the arrangement region 301 in conformity with change in size of the divided region 211. In FIG. 9, an offset value of the arrangement region 301 from the left end of the divided region 211 is denoted with m.

In the third specific example, setting of the arrangement region 301 is changed in conformity with change in size of the divided region 211 while maintaining the direction of the directional axis and width of the arrangement region 301, under a state in which the directional-axis length s and the offset value m are fixed irrespective of change of the lateral width w of the divided region 211. However, as illustrated in the middle row of FIG. 9, when a part of the arrangement region 301 ranges out over the divided region 211, the directional-axis length of the arrangement region 301 is reduced by an over-ranging amount.

Note that, in the case of FIG. 9, the offset value m, which is from the left end of the divided region 211 to the starting point of the arrangement region 301, is provided and fixed. However, an offset value, which is from the right end of the divided region 211 to the terminating point of the arrangement region 301, may be provided and fixed.

<Modification Example of Change in Setting of Arrangement Region 301 in Conformity with Change in Size of Divided Region 211>

In the description given above, it is assumed that the arrangement region 301 is changed in size and position in accordance with change in size of the divided region 211, while maintaining the direction of the directional axis and width. In a modification example, when the lateral width w of the divided region 211, which is parallel to the directional axis of the arrangement region 301, is reduced, the display control unit 124 may rotate the directional axis of the arrangement region 301 by an angle of 90 degrees. For example, when the lateral width w of the divided region 211, which is parallel to the directional axis of the arrangement region 301, is reduced, the ratio s/w of the directional-axis length s to the lateral width w of the divided region 211 is equal to or greater than a predetermined threshold value, and the vertical width of the divided region 211, which is orthogonal to the directional axis of the arrangement region 301, is equal to or larger than the directional-axis length s, the display control unit 124 may change the directional axis of the arrangement region 301 from lateral orientation to vertical orientation.

<Example of Shape of Arrangement Region 301>

Next, an example of a shape of the arrangement region 301 is described. As described above, the shape of the arrangement region 301 is not limited to a rectangular shape, and may have other shapes. FIGS. 10A to 10D illustrate examples of the shape of the arrangement region 301.

Figure 10A:
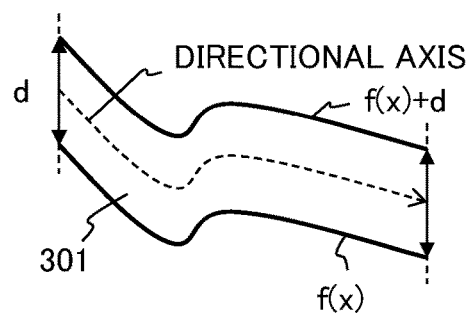
FIG. 10A to FIG. 10D are examples of a shape of the arrangement region.

FIG. 10A illustrates an example in which the shape of the arrangement region 301 is defined with a linear function f(x). A width d is defined separately. A directional axis is defined with the center line of the arrangement region 301.

Figure 10B:
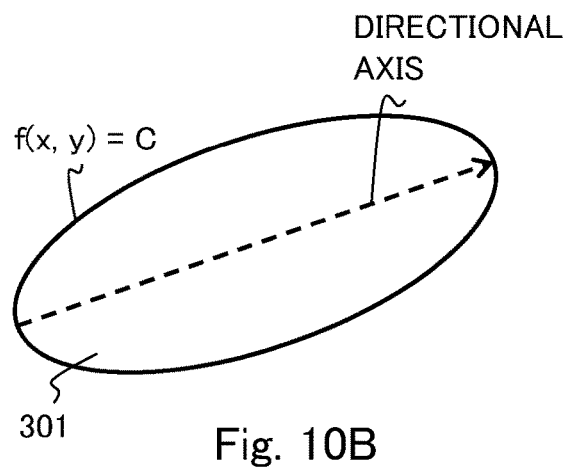

FIG. 10B illustrates an example in which the shape of the arrangement region 301 is defined with an elliptic function f(x, y)=C. A directional axis is defined with a line connecting focal points of an ellipse.

Figure 10C:
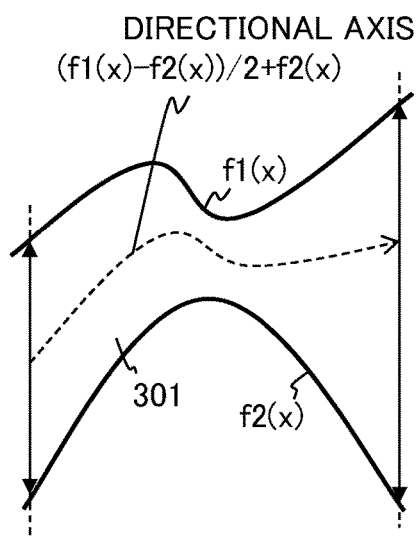

FIG. 10C illustrates an example in which the shape of the arrangement region 301 is defined with different linear functions $f1(x)$ and $f2(x)$. A directional axis is defined by using a relation between the two different linear functions.

Figure 10D:
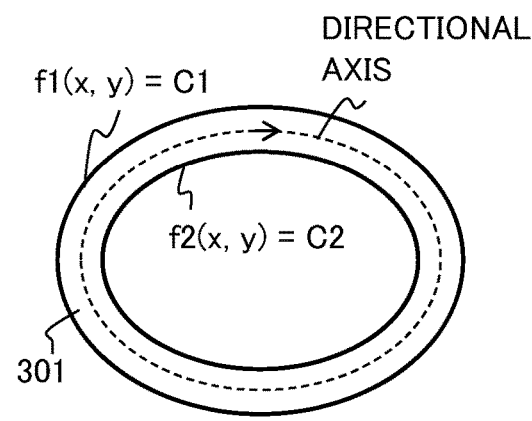

FIG. 10D illustrates an example in which the shape of the arrangement region 301 is defined as a ring region represented by different elliptic functions $f1(x, y)=C1$ and $f2(x, y)=C2$. A directional axis is defined by using a relation between the two different elliptic functions.

Note that, the shape of the arrangement region 301 is not limited to a rectangular shape or the examples in FIGS. 10A to 10D, and may be arbitrarily defined. For example, the width of the arrangement region 301 may be extremely narrowed, and the shape of the arrangement region 301 may be defined substantially as a line.

<Attribute Information Relating to Display Objects 302 Arranged on Arrangement Region 301>

Next, attribute information relating to the display objects 302 arranged on the arrangement region 301 is described.

Figure 11:
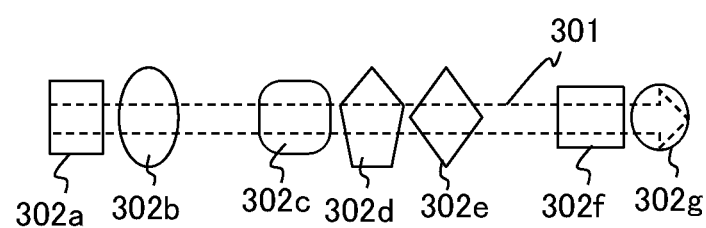
FIG. 11 is a diagram for describing attribute information relating to display objects (base justification, middle justification, or end justification).

FIG. 11 is a diagram for describing base justification, middle justification, or end justification that can be set as attribution information relating to display objects 302a to 302g arranged on the arrangement region 301. Here, when there is no need to distinguish the display objects 302a to 302g from one another individually, the display object 302 is simply referred to.

Base justification, middle justification, or end justification can be set for the display objects 302a to 302g arranged on the arrangement region 301 as attribute information.

In FIG. 11, base justification is set for the display objects 302a and 302b as attribute information. The display objects 302a and 302b are justified and arranged on the starting point side (the left side in the drawing) of the arrangement region 301.

Middle justification is set for the display objects 302c to 302e as attribute information. The display objects 302c to 302e are justified and arranged in the middle of the arrangement region 301.

End justification is set for the display objects 302f and 302g as attribute information. The display objects 302f and 302g are justified and arranged on the terminal point side (the right side in the drawing) of the arrangement region 301.

Note that, in the example of FIG. 11, the different types of attribute information (base justification, middle justification, or end justification) are set for the plurality of display objects 302 arranged on the same arrangement region 301. However, the same type of attribution information (base justification, middle justification, or end justification) may be set collectively for the plurality of display objects 302 arranged on the same arrangement region 301.

Figure 12:
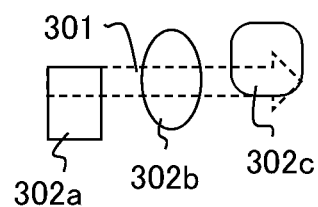
FIG. 12 is a diagram for describing attribute information relating to display objects (upper alignment, middle alignment, or lower alignment).

Next, FIG. 12 is a diagram for describing upper alignment, middle alignment, or lower alignment that can be set as attribute information relating to the display objects 302a to 302c arranged on the arrangement region 301. Here, when there is no need to distinguish the display objects 302a to 302c from one another individually, the display object 302 is simply referred to.

Upper alignment, middle alignment, or lower alignment can be set for the display objects 302a to 302c arranged on the arrangement region 301 as attribute information.

In FIG. 12, upper alignment is set for the display object 302a as attribute information. The display object 302a is arranged to have an upper end aligned with the upper end of the arrangement region 301.

Middle alignment is set for the display object 302b as attribute information. The display object 302b is arranged to have a center aligned with the center of the arrangement region 301.

Lower alignment is set for the display object 302c as attribute information. The display object 302c is arranged to have a lower end aligned with the lower end of the arrangement region 301.

Note that, in the example of FIG. 12, the different types of attribute information (upper alignment, middle alignment, or lower alignment) are set for the plurality of display objects 302 arranged on the same arrangement region 301. However, the same type of attribution information (upper alignment, middle alignment, or lower alignment) may be set collectively for the plurality of display objects 302 arranged on the same arrangement region 301.

Figure 13:
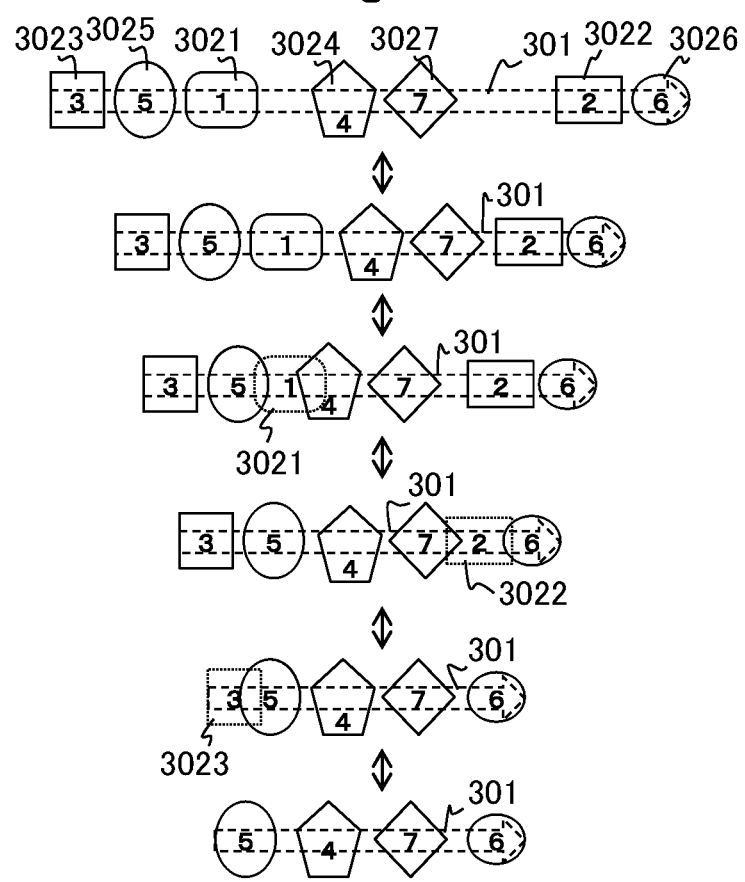
FIG. 13 is a diagram for describing attribute information relating to display objects (priority, and visible or invisible).

Next, FIG. 13 is a diagram for describing priority and visible or invisible as attribute information relating to display objects 3021 to 3027 arranged on the arrangement region 301. Here, when there is no need to distinguish the display objects 3021 to 3027 from one another individually, the display object 302 is simply referred to.

As attribute information, the plurality of display objects 302 arranged on the arrangement region 301 can be set to have priority relative to other display objects 302 arranged on the same arrangement region 301. A number following the display object 302 is a value indicating priority. In the present embodiment, a greater value indicates higher priority. In the following drawings, the same is applied. As attribute information, the display objects 302 arranged on the arrangement region 301 are set to be visible or invisible.

In the example of FIG. 13, the display objects 3021 to 3027 being different in priority are arranged on the arrangement region 301. Under a state illustrated in the uppermost row, attribution information relating to the display objects 3021 to 3027 is set to be visible.

For example, when the directional-axis length of the arrangement region 301 is reduced in accordance with change in size (downsizing) of the divided region 211 (not illustrated) from the state illustrated in the uppermost row, the seven display objects 302 are displayed at closer intervals while maintaining the sizes as illustrated in the second row of FIG. 13.

Moreover, as illustrated in the third row of the FIG. 13, when the directional-axis length of the arrangement region 301 is further reduced and the seven display objects 302 cannot be arranged separately, the display object 3021 having the lowest priority among the seven display objects 302 is weeded out (attribution information is changed from visible to invisible). As a result, the six display objects 302 other than the display object 3021 are displayed on the arrangement region 301.

Further, as illustrated in the fourth row of the FIG. 13, when the directional-axis length of the arrangement region 301 is further reduced and the six display objects 302 cannot be arranged separately, the display object 3022 having the lowest priority among the six display objects 302 is weeded out (attribution information is changed from visible to invisible). As a result, the five display objects 302 other than the display objects 3021 and 3022 are displayed on the arrangement region 301.

Similarly in the fifth and sixth rows of FIG. 13, when the directional-axis length of the arrangement region 301 is reduced, the display objects 3022 are weeded out in the priority order from a lower priority side.

In contrast, when the directional-axis length of the arrangement region 301 is extended in accordance with change in size (upsizing) of the divided region 211 (not illustrated), display of the display objects 302 is changed from the lower side to the upper side of FIG. 13. In other words, the weeded-out display objects 302 (ones having attribute information changed to invisible) are displayed on the arrangement region 301 in the priority order from a higher priority (attribute information is changed to visible).

Note that relative priority of the display object 302 with respect to other display objects 302 arranged on the same arrangement region 301 is set to an initial value in advance, and may be changed by the priority setting unit 125 in accordance with an operation from a user. When the display objects 302 are operation reception buttons, the priority setting unit 125 may change priority in accordance with operation frequency from a user or set priority of the most recently operated object to the highest order. Further, the priority setting unit 125 may dynamically change priority in accordance with a vehicle traveling situation (speed and the like). For example, priority of the display object 302 being a character string is lowered during traveling. Moreover, the priority setting unit 125 may learn a situation where change is made to priority, and may change priority dynamically in accordance with a learning result. With this, visibility of the display objects 302 for a user and operability of the display objects 302 being operation reception buttons can be improved.

Figure 14:
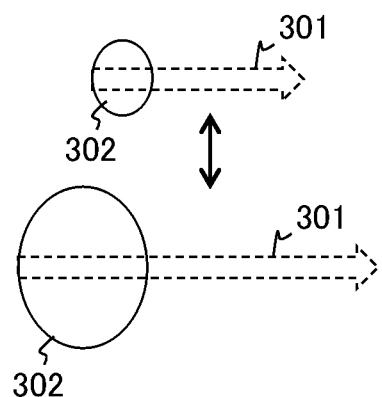
FIG. 14 is a diagram for describing attribute information relating to display objects (region-dependent scaling).

Next, FIG. 14 is a diagram for describing region-dependent scaling as attribute information relating to the display object 302 arranged on the arrangement region 301.

As attribute information, region-dependent scaling can be set for the display object 302 arranged on the arrangement region 301. As illustrated in FIG. 14, the display object 302 for which region-dependent scaling is set as attribution information is upsized when the directional-axis length of the arrangement region 301 is extended, and is downsized when the directional-axis length of the arrangement region 301 is reduced. However, a minimum size and a maximum size may be set for the display object 302.

Figure 15:
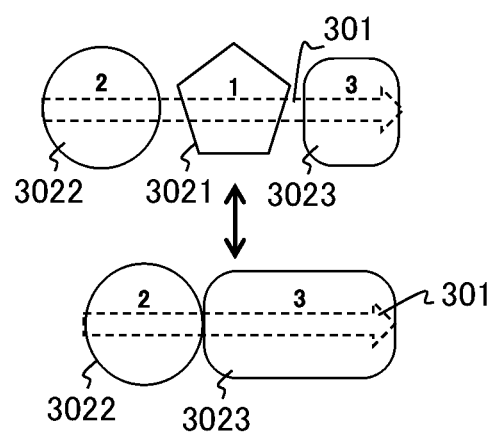
FIG. 15 is a diagram for describing attribute information relating to display objects (margin extension).

Next, FIG. 15 is a diagram for describing margin extension as attribute information relating to the display objects 3021 to 3023 arranged on the arrangement region 301. Here, when there is no need to distinguish the display objects 3021 to 3023 from one another individually, the display object 302 is simply referred to.

Margin extension can be set for the display objects 302 arranged on the arrangement region 301 as attribute information.

In the example of FIG. 15, margin extension is set as attribute information only for the display object 3023 among the display objects 3021 to 3023 being different in priority, which are illustrated in the upper row.

For example, as illustrated in the lower row, when the directional-axis length of the arrangement region 301 is reduced in accordance with change in size (downsizing) of the divided region 211 (not illustrated) from the state illustrated in the upper row, and the three display objects 3021 to 3023 cannot be arranged separately, the display object 3021 having the lowest priority among the three display objects 3021 to 3023 is weeded out (attribution information is changed to invisible). Further, a margin generated by weeding out the display object 3021 is occupied by extending the lateral width of the display object 3013 for which margin extension is set as attribute information. With this, a margin generated on the arrangement region 301 can be utilized effectively.

In contrast, for example, as illustrated in the upper row, when the directional-axis length of the arrangement region 301 is extended in accordance with change in size (upsizing) of the divided region 211 (not illustrated) from the state illustrated in the lower row, and the three display objects 3021 to 3023 can be arranged separately, the display object 3021 is restored on the arrangement region 301 (attribution information is changed to visible).

Next, description is made on setting in which, when the plurality of arrangement regions 301 provided on the same divided region 211 partially overlap with each other, the display objects arranged on the arrangement region 3011 having lower priority are moved instead of weeding out the arrangement region 3011 in a unit of arrangement region.

In the description with reference to FIG. 6, when the arrangement regions 3011 and 3012 provided on the same divided region 211 partially overlap each other, the arrangement region 3011 having lower priority is weeded out in a unit of arrangement region. However, setting can be performed in such a way as to move the display objects 302 arranged on the arrangement region 3011 having lower priority.

FIG. 16 illustrates an example of moving the display objects arranged on the arrangement region 3011 having lower priority when the plurality of arrangement regions 301 provided on the same divided region 211 partially overlap each other.

In the example of FIG. 16, the arrangement region 3011 having a priority degree of 1 and the arrangement region 3012 having a priority degree of 2, which are provided on the divided region 211, are set to interfere each other. The seven display objects 302 being different in priority are arranged on the arrangement region 3011, and the six display objects 302 being different in priority are arranged on the arrangement region 3012.

For example, when the divided region 211 is downsized from the state illustrated in the upper row, the arrangement regions 3011 and 3012 have an interval therebetween that is gradually narrowed under a state of maintaining the directions of the directional axes and widths, and finally overlap (intersect) each other partially, as illustrated in the lower row in FIG. 16. In this case, arrangement of the six display objects 302 on the arrangement region 3012 having priority higher than that of the arrangement region 3011 is not changed. Meanwhile, on the arrangement region 3011 having lower priority, the display objects 3027 and 3022 are moved to left and right, respectively, in order to prioritize the arrangement region 3012. As a result, the seven display objects 302 cannot be arranged on the arrangement region 3011, separately. Thus, the display object 3021 having the lowest priority on the arrangement region 3011 is weeded out (attribution information is changed from visible to invisible).

In contrast, when the divided region 211 (not illustrated) is upsized from the state illustrated in the lower row, the display object 3021 is displayed again on the arrangement region 3011 as illustrated in the upper row of FIG. 16 (attribution information is changed from invisible to visible).

<Display Control Processing Performed by Onboard Device 10>

Figure 17:
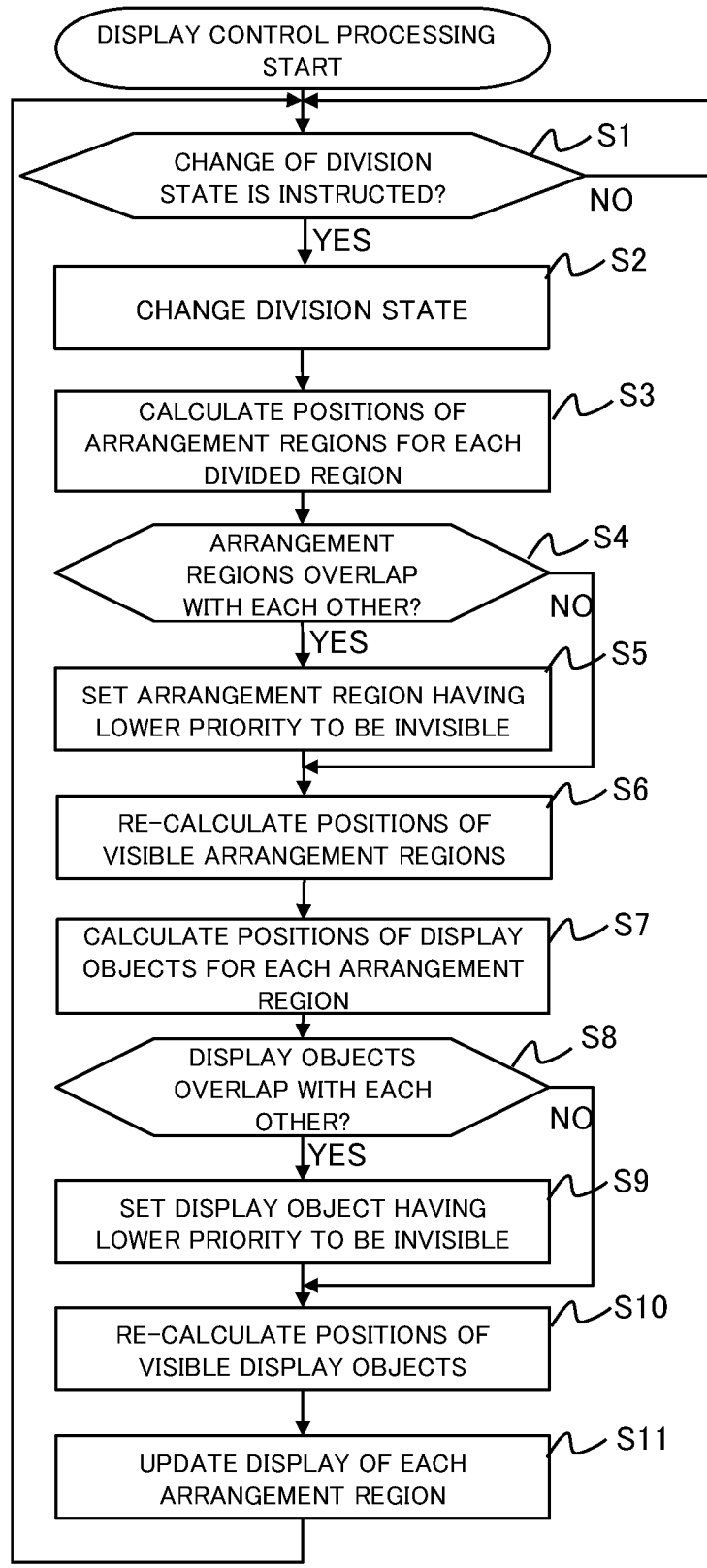
FIG. 17 is a flowchart for describing one example of display control processing executed by an onboard device 10.

Next, FIG. 17 is a flowchart illustrating one example of the display control processing executed by the onboard device 10.

The display control processing is started after activation of the onboard device 10, and is continuously executed until an operation of the onboard device 10 is completed.

First, the divided-region setting unit 123 determines whether an instruction of changing the division state of the divided region 211 is given by a user, based on notification from the operation detection unit 122 (Step S1). Here, when it is determined that the instruction of changing the division state of the divided region 211 is not given (NO in Step S1), the divided-region setting unit 123 repeats the determination. When it is determined that the instruction of changing the division state of the divided region 211 is given (YES in Step S1), the divided-region setting unit 123 changes the division state of the divided region 211 in accordance with an operation from a user (Step S2).

Subsequently, in accordance with the divided region 211 having a division state changed in Step S2, the display control unit 124 calculates sizes and positions of the arrangement regions 301 which are provided on each of the divided regions 211 and are set to be visible as attribution information, in accordance with a predetermined rule (Step S3). Subsequently, the display control unit 124 determines whether the arrangement regions 301 which are calculated in Step S3 and are provided on the same divided region 211, overlap at least partially with each other (Step S4).

Here, when it is determined that the arrangement regions 301 provided on the same divided region 211 overlap at least partially with each other (YES in Step S4), the display control unit 124 changes attribution information from visible to invisible, the attribution information relating to the arrangement region 301 having lower priority among the overlapping arrangement regions 301 (Step S5). In contrast, when it is determined that the arrangement regions 301 provided on the same divided region 211 do not overlap with each other (NO in Step S4), the display control unit 124 skips Step S5.

Subsequently, in accordance with the divided region 211 having a division state changed in Step S2, the display control unit 124 re-calculates sizes and positions of the arrangement regions 301 which are provided on each of the divided regions 211 and are set to be visible as attribution information, in accordance with a predetermined rule (Step S6).

Subsequently, the display control unit 124 calculates positions of the display objects 302 which are set to be visible as attribute information and are arranged on each of the arrangement regions 301 on each of the divided regions 211, in accordance with a predetermined rule (Step S7). Subsequently, the display control unit 124 determines whether the display objects 302 which are calculated in Step S7 and are arranged on the same arrangement region 301, overlap at least partially with each other (Step S8).

Here, when it is determined that the display objects 302 arranged on the same arrangement region 301 overlap at least partially with each other (YES in Step S8), the display control unit 124 changes attribution information from visible to invisible, the attribution information relating to the display object 302 having lower priority among the overlapping display objects 302 (Step S9). In contrast, when it is determined that the display objects 302 arranged on the same arrangement region 301 do not overlap with each other (NO in Step S8), the display control unit 124 skips Step S9.

Subsequently, the display control unit 124 re-calculates positions of the display objects 302 which are set to be visible as attribute information and are arranged on each of the arrangement regions 301 on each of the divided regions 211, in accordance with a predetermined rule (Step S10).

Subsequently, the display control unit 124 reflects re-calculation results in Steps S6 and S10 to update the positions of the arrangement regions 301 on each of the divided regions 211, and update the positions of the display objects 302 on each of the arrangement regions 301 (Step S11). After that, the processing returns to Step S1, and Step S1 and the steps thereafter are repeated.

According to the display control processing executed by the onboard device 10 described above, a division state of the divided regions 211 on the display screen can be changed dynamically in accordance with a touch operation from a user, and display of the display objects 302 displayed on the divided region 211 can be dynamically changed in accordance with dynamic change of each of the divided regions 211. Therefore, screen display excellent in visibility and improved in intuitive operability for a user can be achieved.

Note that the display control processing executed by the onboard device 10, which is described above, can be executed without depending on an aspect ratio or a resolution of the first display 21.

The present invention is applicable not only to the onboard device 10 including the displays (the first display 21 and the second display 22) as in the present embodiment but also to a case where, for example, a screen projected by a projector is controlled.

The effects described in the present specification are merely examples, and are not limited thereto. Other effects may be exerted.

The present invention is not limited to the embodiment described above, and includes various modification examples. For example, each of the embodiments described above is described in detail for the sake of easier understanding of the present invention, and the present invention is not necessarily limited to including all the configurations described herein. It is possible to replace a part of a configuration of one embodiment with a configuration of another embodiment. It is also possible to add a configuration of one embodiment to a configuration of another embodiment. Another configuration can be added to, deleted from, and replaced with a part of a configuration of each embodiment.

A part of or an entirety of the configurations, functions, processing units, processing means, and the like described above may be implemented by hardware by designing those with, for example, integrated circuits or the like. Each of the configurations, functions and the like described above may be implemented by software by a processor that interprets and executes programs for achieving each function. Information for achieving each of the functions, such as a program, a determination table, and a file may be placed in a storage device such as a memory, an HDD, and a solid state disk (SSD), and a recording medium such as an IC card, a secure digital (SD) card, and a DVD. Illustrations of control lines and information lines are those considered to be necessary for the sake of description, and not necessarily include all the control lines and information lines necessary as a product. In actuality, it may be considered that almost all the configurations are connected to each other.

In addition to the display control device and the display control method, the present invention may be provided in various forms such as a computer-readable program.

REFERENCE SIGNS LIST

10: Onboard device, 11: Arithmetic processing device, 21: First display, 22: Second display, 23: Storage device, 24: Voice input/output device, 25: Input device, 26: ROM device, 27: Vehicle speed sensor, 28: Gyro sensor, 29: GPS reception device, 30: FM multiplex broadcasting reception device, 31: Beacon reception device, 111: CPU, 112: RAM, 113: ROM, 114: I/F, 115: Bus, 120: Control unit, 121: Input reception unit, 122: Operation detection unit, 123: Divided-region setting unit, 124: Display control unit, 125: Priority setting unit, 126: Function processing unit, 130: Storage unit, 131: Map information, 132: Divided-region information, 133: Arrangement region information, 134: Display object information, 211: Divided region, 212: Pointer, 241: Microphone, 242: Speaker, 251: Touch panel, 252: Dial switch, 301: Arrangement region, 302: Display object.

What is claimed is:

1. A display control device comprising:
a central processing unit configured to:
dynamically change a size of a divided region provided on a screen, in accordance with an operation from a user;
provide arrangement regions on the divided region and change a relative positional relationship between the arrangement regions provided on the same divided region in conformity with change in size of the divided region,
wherein each of the arrangement regions contain a plurality of display objects therein arranged; and
set relative priority with respect to the arrangement regions provided on the same display region,
wherein in a case where the relative positional relationship between the arrangement regions provided on the same divided region is changed, which causes the arrangement regions to overlap at least partially with each other, the central processing unit sets the arrangement regions to be visible or invisible based on changes to an attribute of at least one of the arrangement regions with lower priority from visible to invisible, and controls the display of all the plurality of display objects arranged on the at least one of the arrangement regions set invisible, to remove from the screen collectively, based on the priority set for each of the arrangement regions.

2. The display control device according to claim 1, wherein the central processing unit changes sizes of the arrangement regions in conformity with change in size of the divided region, and changes arrangement of the display objects on the arrangement regions that are changed in size.

3. The display control device according to claim 2, wherein the central processing unit sets relative priority with respect to the display objects arranged on the same arrangement region, and in a case where arrangement of the display objects on the arrangement regions is changed, which causes the display objects on the same arrangement region overlap at least partially with each other, the central processing unit sets the arrangement regions to be visible or invisible based on changes the attribute information of a display object with lower priority from visible to invisible and remove the display of the display object with lower priority from the screen, based on the priority set with respect to each of the display objects.

4. The display control device according to claim 1, wherein the central processing unit changes sizes of the arrangement regions in conformity with change in size of the divided region, and changes arrangement of the display objects on the arrangement regions that are changed in size, without changing sizes of the display objects.

5. The display control device according to claim 1, wherein
the central processing unit changes sizes of the arrangement regions in conformity with change in size of the divided region, and changes sizes of the display objects on the arrangement regions that are changed in size.

6. The display control device according to claim 1, wherein the central processing unit changes the priority, based on an input from a user.

7. The display control device according to claim 6, wherein the central processing unit learns a situation where the priority is changed, and dynamically changes the priority, based on a learning result.

8. The display control device according to claim 7, wherein the central processing unit dynamically changes display of the display objects in conformity with dynamic change of the priority.

9. The display control device according to claim 1, wherein each of the arrangement regions includes a directional axis, and the central processing unit moves display of the display objects along the directional axis.

10. A display control method performed by a display control device, the display control method comprising:

a divided-region setting step of dynamically changing a size of a divided region provided on a screen, in accordance with an operation from a user; and a display control step of changing a relative positional relationship between arrangement regions provided on the same divided region in conformity with change in size of the divided region, each of the arrangement regions on which a plurality of display objects are arranged, wherein in the display control step, in a case where the relative positional relationship between the arrangement regions provided on the same divided region is changed, which causes the arrangement regions to overlap at least partially with each other, the arrangement regions are set to be visible or invisible based on changes to an attribute of at least one of the arrangement regions with lower priority that is changed from visible to invisible, and controls the display of all the plurality of display objects arranged on the at least one of the arrangement regions changed to invisible to remove from the screen collectively, based on priority that is set for each of the arrangement regions, the priority being relative priority between the arrangement regions provided on the same divided region.

* * * * *